(12) United States Patent
Hobson et al.

(10) Patent No.: US 10,768,687 B2
(45) Date of Patent: *Sep. 8, 2020

(54) DETERMINATION OF A ZERO WATT STATE FOR IMPLEMENTATION

(71) Applicant: Hewlett-Packard Development Company, L.P., Houston, TX (US)

(72) Inventors: Louis B. Hobson, Tomball, TX (US); Michael R. Durham, Tomball, TX (US); Robert S. Wright, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,673

(22) Filed: Jun. 1, 2018

(65) Prior Publication Data

US 2018/0275741 A1 Sep. 27, 2018

Related U.S. Application Data

(63) Continuation of application No. 15/112,620, filed as application No. PCT/US2014/014279 on Jan. 31, 2014, now Pat. No. 10,001,831.

(51) Int. Cl.
*G06F 1/32* (2019.01)
*G06F 9/44* (2018.01)
(Continued)

(52) U.S. Cl.
CPC .............. *G06F 1/3287* (2013.01); *G06F 1/26* (2013.01); *G06F 1/3246* (2013.01);
(Continued)

(58) Field of Classification Search
CPC ........ G06F 1/3287; G06F 1/26; G06F 1/3246; G06F 1/3296; G06F 9/4418
See application file for complete search history.

(56) References Cited

U.S. PATENT DOCUMENTS 5,630,142 A * 5/1997 Crump .................... G06F 1/325
713/323
5,745,391 A * 4/1998 Topor .................... G06F 9/4418
713/310

(Continued)

FOREIGN PATENT DOCUMENTS

| JP | H11-187665 A | 7/1999 |
|---|---|---|
| JP | 2002-189540 A | 7/2002 |

(Continued)

OTHER PUBLICATIONS

Hewlett-Packard Corporation et al., "Advanced Configuration and Power Interface Specification," Dec. 6, 2011, Revision 5.0., first 36 pages.

(Continued)

*Primary Examiner* — Stefan Stoynov
(74) *Attorney, Agent, or Firm* — HP Inc. Patent Department

(57) ABSTRACT

Examples herein disclose determining whether a computing device should implement a zero watt state according to an engagement of a button. The examples disconnect a power source to the computing device based upon the determination the computing device should implement the zero watt state.

11 Claims, 6 Drawing Sheets

(51) Int. Cl.
*G06F 1/3287* (2019.01)
*G06F 1/26* (2006.01)
*G06F 1/3246* (2019.01)
*G06F 1/3296* (2019.01)
*G06F 9/4401* (2018.01)

(52) U.S. Cl.
CPC .......... *G06F 1/3296* (2013.01); *G06F 9/4418* (2013.01); *Y02D 10/172* (2018.01)

(56) References Cited

U.S. PATENT DOCUMENTS

| | | | |
|---|---|---|---|
| 6,216,187 | B1 | 4/2001 | Truong |
| 2005/0055591 | A1* | 3/2005 | Cho ............................ G06F 1/30 713/320 |
| 2006/0236132 | A1 | 10/2006 | Chen |
| 2007/0149256 | A1 | 6/2007 | Burgan |
| 2008/0082845 | A1* | 4/2008 | Morisawa ............. G06F 1/3203 713/323 |
| 2013/0132747 | A1 | 5/2013 | Yanagawa |
| 2013/0275739 | A1* | 10/2013 | Kim .................... G06F 9/44505 713/2 |
| 2014/0006828 | A1 | 1/2014 | Kanematsu |
| 2014/0164803 | A1 | 6/2014 | Huynh |

FOREIGN PATENT DOCUMENTS

| | | |
|---|---|---|
| KR | 10-2010-0079878 A | 7/2010 |
| WO | WO-2001/05200 A1 | 5/2001 |
| WO | WO-2013/160705 A2 | 10/2013 |

OTHER PUBLICATIONS

Vig440J Motherboard Manual, Oct. 3, 2010, Viglen Ltd, Hertfordshire, England, first 5 pages.

* cited by examiner

NORMAL OPERATION STATE

BUTTON ENGAGEMENT

ZERO WATT STATE

BUTTON DISENGAGEMENT

DETERMINATION OF A ZERO WATT STATE FOR IMPLEMENTATION

PRIORITY INFORMATION

This application is a continuation of U.S. National Stage Application No. 15/112,620 filed on Jul. 19, 2016, a continuation of U.S. Patent No. 10,001,831, which claims priority to International Application No. PCT/US2014/014279 filed on Jan. 31, 2014. The contents of which are incorporated herein by reference in its entirety.

BACKGROUND

In computing devices, the Advanced Configuration and Power Interface (ACPI) provides a standard for device configuration and power management by an operating system. Such power management may include implementing power conditional states. The power conditional states may include, by way of example, normal operation, standby, hibernation, and sleep.

BRIEF DESCRIPTION OF THE DRAWINGS

In the accompanying drawings, like numerals refer to like components or blocks. The following detailed description references the drawings, wherein.

DETAILED DESCRIPTION

Figure 1:
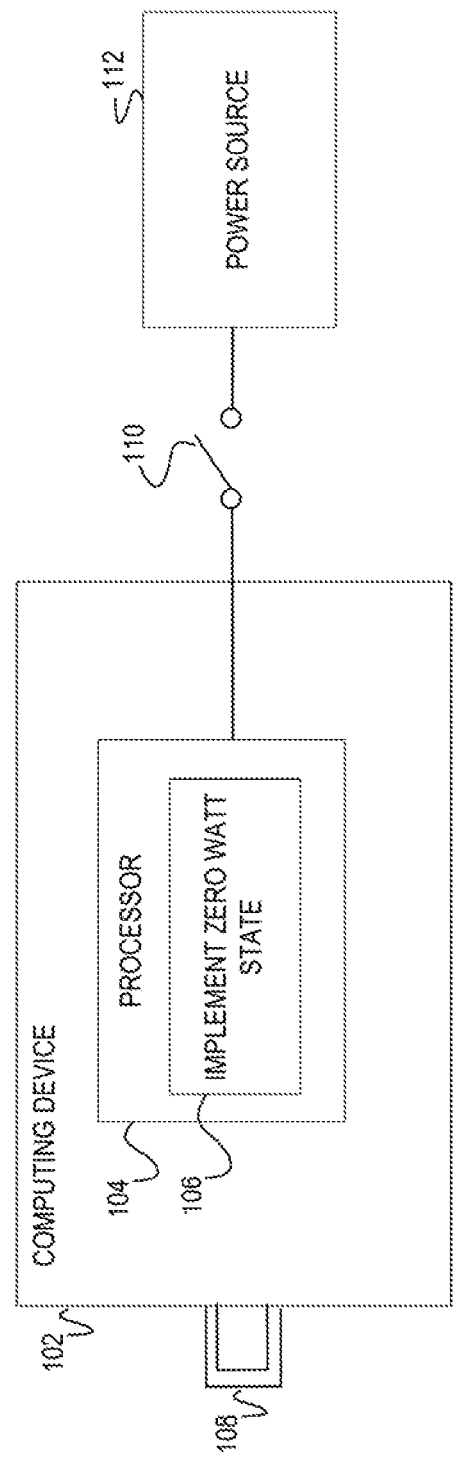
FIG. 1 is a block diagram of an example computing device including a processor to process an engagement of a button and determining whether to disconnect the computing device to a power source for implementation of a zero watt state.

Power states of a computing device represent various power conditions of the computing device. For example, during normal operation of the power state, the computing device pulls a full load from a power source. The power conditional states may include states of inactivity such as standby, suspend, hibernation, sleep, and off. These inactivity states save power by powering down components within the computing device. Powering down the components within the computing device enables each of these inactive states to save power; however, each of these inactive states may pull a residual power thus consuming additional power resources. For example, in states of inactivity (e.g., suspend, standby, hibernation, sleep, off, etc.) the computing device pulls less power from the power source than during normal operation. Each of these states consume resources, such as expending power and increasing costs.

To address these issues, examples disclosed herein reduce power consumption in a computing device through implementation of a zero watt state. The examples determine if the computing device should implement the zero watt state according to the engagement of the button. Based upon the decision to implement the zero watt state, the examples disconnect the computing device to a power source, there upon implementing the zero watt state. The zero watt power state consumes zero power through the disconnection of the computing device to the power source. In the zero watt state, the computing device pulls no power, thus consuming fewer resources. Additionally, processing the engagement of the button for implementing the zero watt state of the computing device enables a disconnection of the computing device to the power source without further user action.

In another examples discussed herein, upon engagement of the button, an interrupt signal may be transmitted to the operating system. The operating system may then write a value corresponding to the inactivity state to a register internal to the computing device. This example provides an automation of implementing the zero watt state to reduce an amount of resources the computing device consumes when not in use.

In a further example discussed herein, the processor implements the hibernation state prior to implementation of the zero watt state. Implementing the hibernation state prior to the zero watt state, coordinates the various conditional power states prior to the zero watt state for preventing data loss. For example, data may reside at a volatile memory which retains data when powered at states of inactivity prior to the hibernation and sleep states; however, once the power is interrupted, data may be lost. Thus, implementing the hibernation state prior to the interrupting the power at the zero watt state ensures data is preserved in a non-volatile memory once the power source is disconnected to the computing device.

In summary, examples disclosed herein reduce power consumption in a computing device through implementing a zero watt state. Additionally, the examples herein prevent data loss by coordinating the conditional power states prior to the zero watt state usage.

Referring now to the figures, FIG. 1 is a block diagram of an example computing device 102 including a processor 104 to process an engagement of a button 108. Processing the engagement of the button 108, the processor 104 determines whether to implement a zero watt state at module 106. Upon determining to implement the zero watt state, the processor 104 transmits a signal for a disconnection 110 of the computing device 102 to the power source 112. Upon the disconnection 110 of the computing device 102 to the power source 112, the computing device 102 enters the zero watt state. The zero watt of the computing device 102 represents a power condition in which the computing device 102 consumes zero power upon the disconnection 110 of the computing device 102 to the power source 112. Implementing the zero watt state of the computing device 102 enables the computing device 102 to disconnect the power source 112 without further user action. Additionally, including the zero watt state enables the computing device 102 to pull zero power and thus decreasing the overall power consumption.

Power states of the computing device 102 represent various power conditions of computing device 102. For example, a normal operation state of the computing device 102 may include operation of the computing device 102 pulling a full load of power from the power source 112. In states of inactivity, such as a suspend state, hibernation state, sleep state, and/of off state, the computing device 102 pulls less power from the power source than during the normal operation state. For example, in the suspend state, the processor consumes less power, but power is maintained in a volatile memory that retains data while powered on, but the suspend state may lose data when the power is interrupted. In the hibernation state, data is maintained in a non-volatile memory that retains data even while powered the non-volatile memory is powered down. Thus, in the hibernation state, power may be further reduced. In the sleep state, the computing device 102 may shut down as additional power is also reduced; however, the sleep state may maintain a low level of power as the computing device 102 remains connected to the power source 112. Each of these states consume resources, such as expending power, increasing costs, etc. The zero watt power state consumes zero power through the disconnection 110 of the computing device 102 to the power source 112. In the zero watt state, the computing device 102 pulls no power, thus consuming fewer resources. The computing device 102 is an electronic device with the processor 104 and as such implementations of the computing device 102 include a target device, mobile device, client device, personal computer, desktop computer, laptop, tablet, video game console, or other type of electronic device capable of processing an engagement of the button 108 and determining whether to implement the zero watt state.

The button 108 is a mechanical component which is pressed and/or pulled to activate a circuit (not illustrated) within the computing device 102. Through pressing and/or pulling the button 108 enables an electrical signal to activate the circuit. The circuit signals to the processor 104 to process the engagement of the button 108. The processor 104 processes the engagement of the button 108 to determine whether the computing device should implement the zero watt state at module 106. The engagement of the button 108, by way of example, may include a user compressing, pushing, and/or engaging the button 108 to signal the processor 104 to analyze the engagement. In another implementation, the button 108 may include an outer shell and when compressed contacts the inner shell of the button, generating an electrical signal for the processor 104. This signal may include an interrupt signal which may be transmitted to an operating system associated with the computing device 102. The operating system receives this interrupt signal and writes a value to a register corresponding to a state of inactivity. Such state of inactivity may include sleep, standby, hibernation, and off. This implementation is described in detail in a later figure. Although FIG. 1 illustrates the button 108 as two components and as an appendage on the computing device 102, implementations should not be limited to this illustration as this was done for clarification purposes. For example, the button 108 may include a spring button and/or a button flesh to the computing device 102. The engagement and disengagement positions of the button 108 are explained in detail in the next figures.

The processor 104 processes the engagement of the button 108 to determine whether to implement the zero watt state at module 106. Processing the engagement of the button 108 provides a seamless interaction for a user, as implementing the zero watt state provides minimal interaction for the user. Implementations of the processor 104 include a controller, electronic device, computing system, microprocessor, microchip, chipset, electronic circuit, semiconductor, microcontroller, central processing unit (CPU), or other type of processing system capable of processing the engagement of the button 108 and determining whether to implement the zero watt state.

At module 106, the processor 104 determines whether to implement the zero watt state. In one implementation, the processor 104 determines whether the computing device 102 is currently in a state of hibernation or sleep prior to implementing the zero watt state. In this manner, the current power state of the computing device 102 is contingent upon implementing the zero watt state. In another implementation, the processor 104 may determine if the button 108 has been engaged for a period of time prior to implementing the zero watt state. The module 106 may include an instruction, set of instructions, process, operation, logic, technique, function, firmware, and/or software executable by the processor 104 to determine whether to implement the zero watt state according to the engagement of the button 108.

The disconnection 110 provides contacts between the power source 112 and the computing device 102. In one implementation, the disconnection 110 may include a switch. In another implementation, the processor 104 may signal to connect the computing device 102 to the power source 112. Upon the connection of the computing device 102 to the power source 112, the computing device 102 may resume a state of normal operation. Further, although FIG. 1 illustrates the disconnection 110 as outside of the computing device 102, implementations should not be limited as this was done for illustration purposes. For example, the disconnection 110 may be included as part of the computing device 102.

The power source 112 is a power supply that provides voltage and/or current to the computing device 102. Upon disconnection 110 of the power source 112 to the computing device 102 enters the zero watt state. In implementations, the power the computing device 102 pulls from the power source 112 depends on the power state implemented at the computing device 102. For example, normal operation pulls the most power, with standby state pulling less power, hibernation state pulling less than standby, and the sleep mode pulling an even lesser amount of power. The zero watt state pulls the least amount of power in the sense the computing device 102 pulls no power during the zero watt state. In another implementation, the power source 112 includes an alternating current (AC) source. Other implementations of the power source 112 include a power supply, voltage supply, currently supply, power feed, power source, generator, power circuit, energy storage, power system, or other type of power source capable of providing power to the computing device 102.

FIGS. 2A-2D are block diagrams of example button positions including an engagement of the button for implementation of the zero watt state and a disengagement of the button to implement a normal operation of the computing device.

Figure 2A:
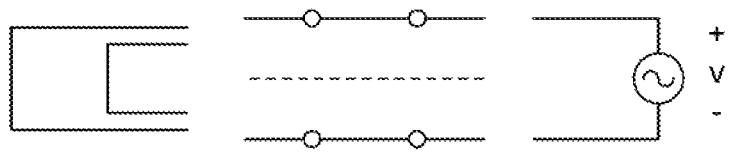
FIGS. 2A-2D is are block diagrams of example button positions include an engagement and disengagement of the button for implementation of a zero watt state and a normal operation of the computing device, accordingly.

FIG. 2A illustrates a normal operating state of the computing device prior to the engagement of the button. The power source remains connected as illustrated with the contacts. In the normal operating state, the computing device may pull a full load from the power source.

Figure 2B:
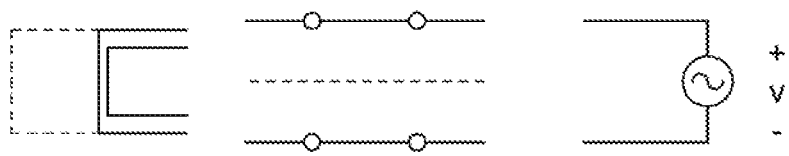

FIG. 2B illustrates the engagement of the button prior to a disconnection of the computing device to the power source. Upon the engagement of the button, the computing device may remain in an inactive state in which the computing device remains connected to the power source or the computing device may implement the zero watt state as in FIG. 2C. As illustrated in FIGS. 2A-2D, the button may include an outer shell and an inner shell. When the outer shell is compressed to the inner shell of the button, this generates an interrupt signal to an operating system. The operating system receives the interrupt signal and checks the registers to determine whether to implement the zero watt state and as such, the operating system writes a value corresponding to the state of inactivity in a register.

Figure 2C:
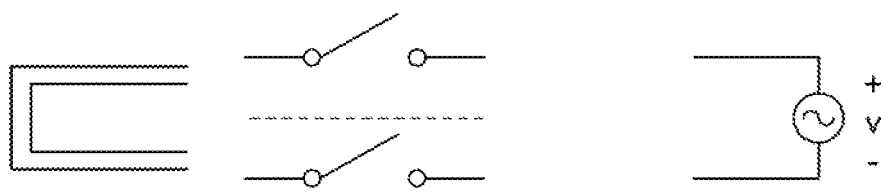

FIG. 2C illustrates an engagement of the button and implementation of the zero watt state of the computing device. Upon the button engagement as observed in FIG. 2B, the contacts are disconnected to the power source. In FIG. 2C, the inner shell or button may be inter-locked so the zero watt feature is engaged. In this implementation, the inner button may disconnect a switch to the power source. The disconnection to the power sources enables the computing device to achieve the zero watt state.

Figure 2D:
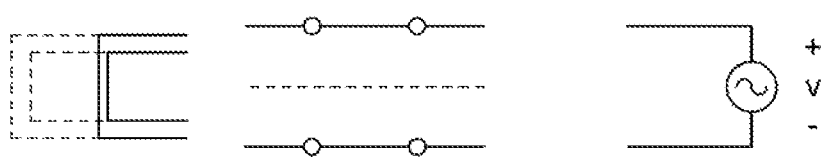

FIG. 2D illustrates a disengagement of the button on the computing device. Upon the disengagement of the button, the processor may transmit a signal for connecting the computing device to the power source. Connecting the computing device to the power source enables the computing device to resume a normal operation state. In one implementation, the contacts may be spring-loaded and thus released after a period of time or upon a further compression of the button. Upon, the disengagement of the button, the computing device may resume normal operation as the contacts enable the connection between the computing device and the power source.

Figure 3:
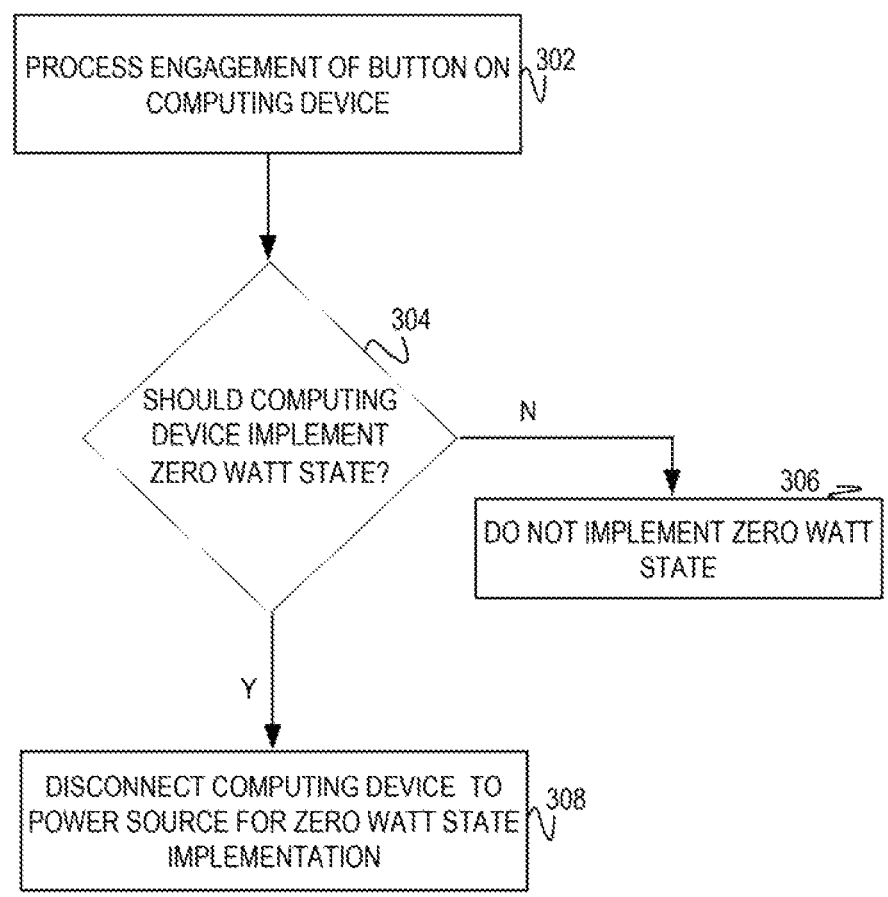
FIG. 3 is a flowchart of an example method to process an engagement of a button on a computing device to implement a zero watt state, accordingly.

FIG. 3 is a flowchart of an example method to process an engagement of a button on a computing device for implementation of a zero watt state, accordingly. The method begins with processing the engagement of the button and may then proceed to determine whether the computing device should implement the zero watt state. Upon determining the computing device should not implement the zero watt state, the method does not implement the zero watt state. Upon determining the computing device should implement the zero watt state, the method disconnects the computing device to the power source for the zero watt state implementation. States of the computing device represent various power conditions of computing device. The zero watt power state consumes zero power through the disconnection of the computing device to the power source. In discussing FIG. 3, references may be made to the components in FIG. 1 and FIGS. 2A-2D to provide contextual examples. For example, processor 104 FIG. 1 executes operations 302-308 to implement the zero watt state of the computing device. In another example, a controller associated with the computing device 102 executes operations 302-308. Further, although FIG. 3 is described as implemented by the computing device 102 as in FIG. 1, it may be executed on other suitable components. For example, FIG. 3 may be implemented in the form of executable instructions on a machine-readable storage medium 604 as in FIG. 6.

At operation 302, the processor processes the engagement of the button on the computing device. At operation 302, a user may compress and/or engage the button thus generating signal to the processor to determine whether the computing device should implement the zero watt state as at operation 304. In this implementation, the engagement of the button generates an interrupt signal which is transmitted to the operating system. The operating system may then write a value corresponding to either the hibernation state, sleep state, or the off state into a register. Processing the engagement of the button to determine whether the computing device should implement the zero watt state minimizes a user learning curve for the zero state watt usage as once the user compresses or engages the button, the computing device takes over without further action from the user.

At operation 304, the processor determines whether the computing device should implement the zero watt state. In one implementation, the processor checks whether a value corresponding to a state of inactivity, such as the hibernation state or the sleep state, was written into a register. Checking the register for the value corresponding to either the hibernation state or the sleep state indicates implementation of one of these states. In this implementation, the processor checks whether the hibernation state or the sleep state is implemented prior to proceeding with implementation of the zero watt state. This implementation prevents data loss when power is interrupted upon the disconnection of the computing device to the power source. If the processor determines the computing device is in the standby state or normal operation, the processor proceeds to operation 306 and does not implement the zero watt state. In another implementation, upon determining the computing device should not implement the zero watt state, the processor proceeds to operation 306 as does not implement the zero watt state. In another implementation, upon determining the computing device should implement the zero watt state, the processor proceeds to operation 308 for disconnecting the computing device to the power source.

At operation 306, upon determining the computing device should not implement the zero watt state, the processor does not implement the zero watt state. In another implementation of operation 306, the computing device may remain in the hibernation state or the sleep state.

At operation 308, upon determining the computing device should implement the zero watt state, the processor disconnects the computing device to the power source for implementation of the zero watt state. In one implementation, the processor transmits a signal to a switch. The switch may form the connection between the computing device and the power source, and as such, when the switch receives the signal from the processor, the switch may connect and/or disconnect the computing device to the power source, accordingly. For example, upon engagement of the button, the processor may transmit the signal for disconnection. In another example, upon disengagement of the button, the processor may transmit the signal for connecting the computing device to the power source. These implementations are described in detail in a later figure. In another implementation, upon determining the computing device should implement the zero watt state, the processor may transmit the signal to a basic input/output system (BIOS) which writes the value corresponding to the zero watt state into a register.

Figure 4:
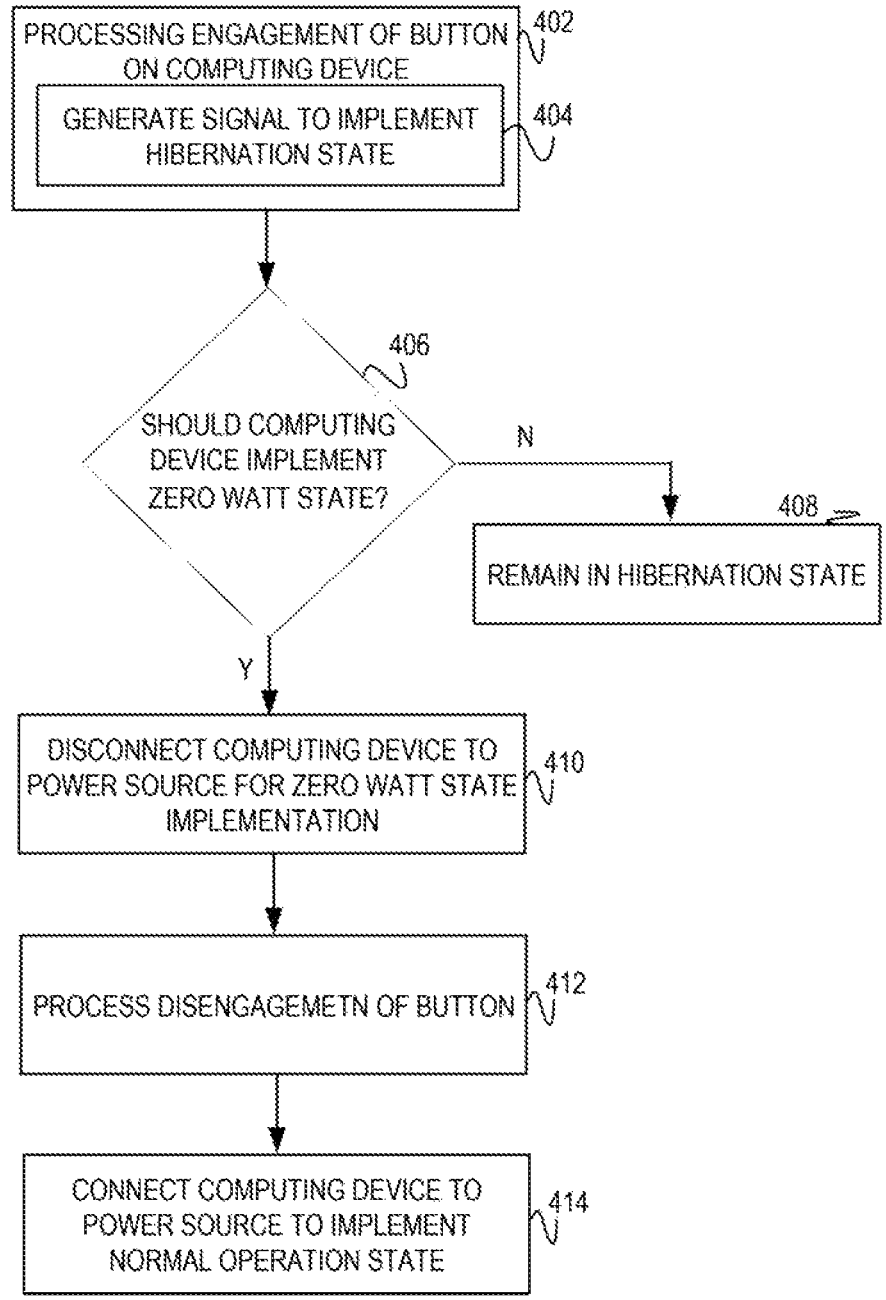
FIG. 4 is a flowchart of an example method to process an engagement of a button on a computing device through generation of a signal to implement a hibernation state prior to implementation of a zero watt state.
Figure 5:
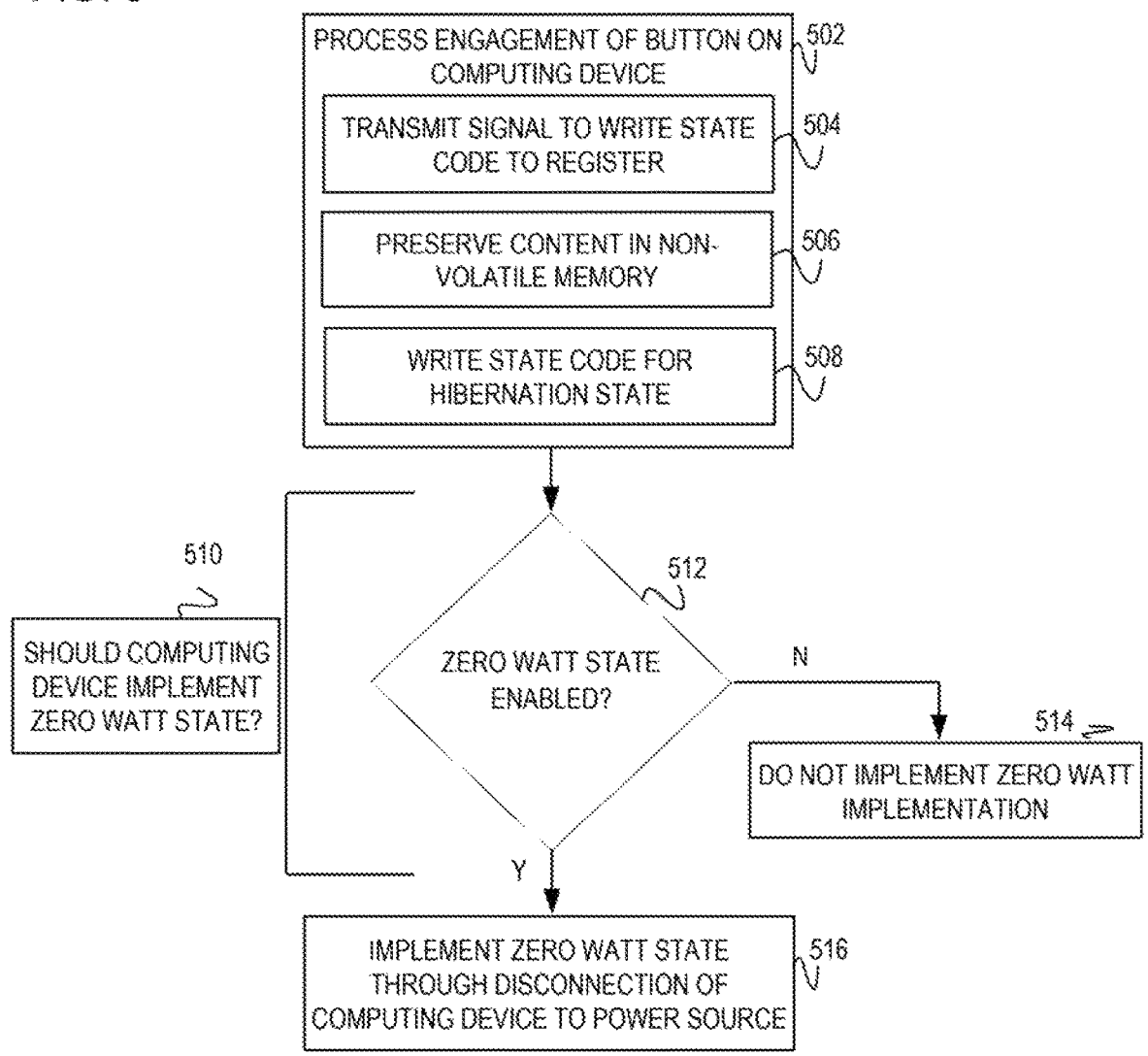
FIG. 5 is a flowchart of an example method to process an engagement of a button on a computing device through a transmission of a signal to an operating system for determining whether the computing device should implement a zero watt state and implementing the zero watt state, accordingly.

FIG. 4 is a flowchart of an example method to process an engagement of a button on a computing device through generation of a signal to implement a hibernation state. In this manner, the hibernation state is implemented prior to implementation of a zero watt state. The method may proceed to determine whether the computing device should implement the zero watt state. Based upon the determination the computing device should enter the zero watt state, the method proceeds to implement the zero watt state by disconnecting the computing device to a power source. If the method determines the computing device should not implement the zero watt state, the method remains in a state of inactivity, such as a sleep state, suspend state, standby state, hibernation state, etc. In discussing FIG. 4, references may be made to the components in FIG. 1 and FIGS. 2A-2D to provide contextual examples. For example, processor 104 FIG. 1 executes operations 502-520 to implement the zero watt state of the computing device. In another example, a controller associated with the computing device 102 operations 502-520. Further, although FIG. 5 is described as implemented by the computing device 102 as in FIG. 1, it may be executed on other suitable components. For example, FIG. 5 may be implemented in the form of executable instructions on a machine-readable storage medium 604 as in FIG. 6.

At operation 402, the processor processes the engagement of the button on the computing device. At operation 402, a user may compress and/or engage the button thus generating a signal to the processor to determine whether to implement the zero watt state. In one implementation, the compression and/or engagement of the button produces an interrupt signal. This signal is transmitted to the operating system to implement an inactivity state, such as a hibernation and/or off state if the computing device is not currently in one of these states. Processing the engagement of the button provides an unchanged perspective to the user as processing the engagement may not require further action from the user. Operation 402 may be similar in functionality to operation 302 as in FIG. 3.

At operation 404, processing the engagement of the button may include generating an interrupt signal for transmission to the operating system. The interrupt signal may indicate to run a pre-boot environment, such as basic input/output system (BIOS) or unified extensible firmware interface (UEFI) which loads the operating system. The operating system receives the interrupt signal, thus indicating to write a value corresponding to the hibernation state to a register internal to the computing device. Implementing the hibernation state prior to implementing the zero watt state prevents data loss when power is interrupted to the random access memory (RAM). For example, in a standby state or suspend state of a computing device, such as S3, the processor may consume less power as the processor may perform fewer operations and data and/or content may be kept in RAM. RAM uses power to maintain the content, thus removing the power prior to transferring the content into a non-volatile memory means the content may be lost. Thus implementing the hibernation state ensures the content is moved to a non-volatile memory for preservation once the power source is disconnected to the computing device.

At operation 406, upon implementing the hibernation state, the processor determines whether the computing device should implement the zero watt state. In the zero watt state, the power source is disconnected from the computing device to ensure the computing device is not consuming power. The processor may determine the processor should not implement the zero watt state as there may be an overriding event, such as monitoring or the computing device is not in the hibernation state. In this implementation, the processor proceeds to operation 408 and remains in the hibernation state. Upon determining the computing device should implement the zero watt state, the processor proceeds to operation 410 for disconnecting the computing device from the power source. Operation 406 may be similar in functionality to operation 304 as in FIG. 3.

At operation 410, the processor disconnects the computing device to the power source, thus implementing the zero watt state. Operation 410 may be similar in functionality to operation 308 as in FIG. 3.

At operation 412, the processor processes the disengagement of the button on the computing device. In one implementation, the button may include a spring loaded type of switch with may be released after a period of time. In this implementation, the processor may track the period of time in which the zero watt state is implemented and after this period of time has passed, the processor may signal to the switch to release the button.

At operation 414, based upon processing the disengagement of the button, the processor connects the computing device to the power source. In this implementation, the computing device may implement a state other than the zero watt state. Such states may include the standby state, sleep state, suspend state, normal operation, etc. In another implementation, upon a threshold of time of continuous disengagement may indicate to implement normal operation of the computing device.

FIG. 5 is a flowchart of an example method to process an engagement of a button on a computing device through a transmission of a signal to an operating system. The operating system writes a state code corresponding to a hibernation state and/or sleep state to a register internal to the computing device. Implementing the hibernation and/or sleep states prior to implementing a zero watt state enables the method preserves content from the computing device into a non-volatile memory to prevent data loss. The method may then determine if the computing device should implement a zero watt state through a determination if the zero watt state is enabled on the computing device. Based upon this determination, the method implements the zero watt state through a disconnection of the computing device to a power source. Disconnecting the computing device from the power source enables the computing device to achieve a true zero watt state in the sense the computing device no longer pulls power from the power source. In this implementation, the zero watt state is considered an off state that is without residual power. The disconnection ensures the computing device pulls no power. Additionally, transmitting an interrupt signal to the operating system for writing the hibernation state code provides an automation of implementing the zero watt state, the automation is user-friendly to reduce an amount of resources (e.g., power) the computing device consumes when not in use. In discussing FIG. 5, references may be made to the components in FIG. 1 and FIGS. 2A-2D to provide contextual examples. For example, processor 104 as in FIG. 1 executes operations 502-520 to implement the zero watt state of the computing device. In another example, a controller associated with the computing device 102 executes operations 502-516. Further, although FIG. 5 is described as implemented by the computing device 102 as in FIG. 1, it may be executed on other suitable components. For example, FIG. 5 may be implemented in the form of executable instructions on a machine-readable storage medium 604 as in FIG. 6.

At operation 502, the processor processes the engagement of the button on the computing device. In operation 502, the user of the computing device may compress and/or engage the button thus generating the signal for transmission to the operating system as at operation 504. Processing the engagement of the button provides an unchanged perspective from the user as the user may engage the button without further action. Operation 502 may be similar in functionality to operations 302 and 402 as in FIGS. 3-4.

At operation 504, the processor transmits an interrupt signal to the operating system. The operating system receives the interrupt signal which indicates the computing system should implement the hibernation state and/or the sleep. Transmitting the interrupt signal provides direction to the operation system to write a value corresponding to the hibernation and/or sleep states in the register as at operation 508.

At operation 506, the processor preserves content and/or data on the computing device into the non-volatile memory prior to disconnecting the computing device to the power source.

At operation 508, the operating system writes the state code representing the hibernation state to a register internal to the computing device. In one implementation, the operating system writes a value representing the hibernation state to the register. This value indicates to the operating system to implement the hibernation state. The hibernation state of the computing device begins to power down the computing device while also retaining its state. In hibernation, the computing device maintains pulling power from the power source. Upon hibernation, the computing device may preserve data and/or content from a random access memory (RAM) to a non-volatile storage. This enables the computing device to resume operations from the data and/or content upon resumption of the computing device. In another implementation, the operating system writes the value corresponding to the sleep state in the register. Implementing the hibernation state and/or sleep state prior to implementation of the zero watt state provides preservation of data and/or content. In another implementation, the processor may verify the computing device is in the hibernation state or the sleep state. Verifying the computing device is currently in the hibernation or sleep state ensures unsaved content is preserved prior to disconnecting the computing device to the power source. This further prevents data loss. Verifying the computing device prevents data and/or content loss in RAM prior to disconnecting the computing device to the power source as RAM consumes power to maintain the data and/or content. Additionally, verifying is currently in the hibernation state ensures the computing device is moving the data and/or content from RAM into the non-volatile memory which does not consume power to maintain the data and/or content.

At operation 510, the processor determines whether the computing should implement the zero watt state. In one implementation, operation 510 may include operations 512-514 to determine whether the computing device should implement the zero watt state. Operation 510 may be similar in functionality to operations 304 and 406 as in FIGS. 3-4.

At operation 512, the processor verifies whether the computing device is enabled for zero watt state implementation. The processor may check a flag for a particular value to determine whether the computing device is enabled for the zero watt state. Upon determining the zero watt state is not enabled, the method may proceed to operation 514 for the processor to not implement the zero watt state. Upon determining the zero watt state is enabled for that particular computing device, the method may proceed to implement the zero watt state as at operation 516.

At operation 514, upon determining the zero watt state is not enabled, the processor does not implement the zero watt state. The user of the computing device may decide to opt-out of the zero watt state and thus allow the computing device to continuously pull power form the power source. In this implementation, the computing device may continuously monitor for a particular event or occurrence on the computing device and thus continuously pulls power from the monitoring operation. In another implementation, a flag on the register may include a value which may override the zero watt state, thus the processor will not implement the zero watt state.

At operation 516, the processor implements the zero watt state through the disconnection of the computing device to the power source. Disconnecting the power source ensures the computing device is not pulling residual power. Operation 516 may be similar in functionality to operations 308 and 410 as in FIGS. 3-4.

Figure 6:
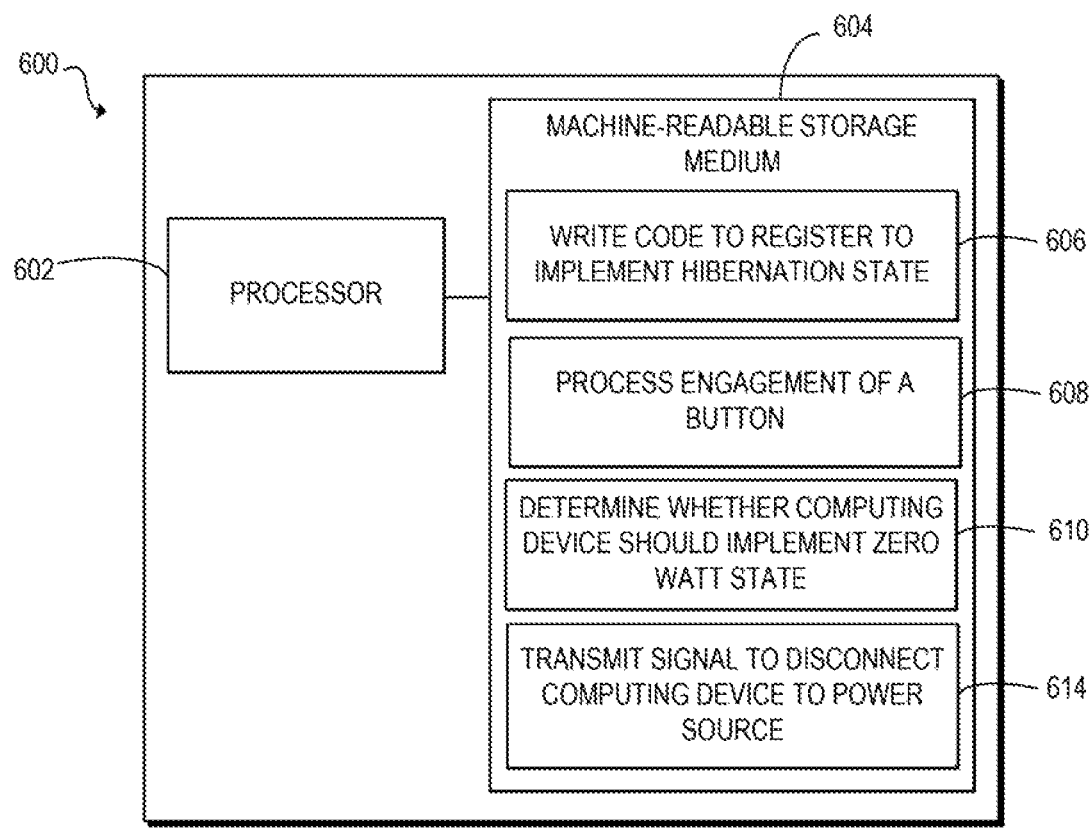
FIG. 6 is a block diagram of an example computing device with a processor to execute instructions in a machine-readable storage medium for processing an engagement of a button and determining whether a computing device should implement a zero watt state.

FIG. 6 is a block diagram of computing device 600 with a processor 602 to execute instructions 606-614 within a machine-readable storage medium 604. Specifically, the computing device 600 with the processor 602 is to process an engagement of a button and determine whether the computing device should implement a zero watt state. Although the computing device 600 includes processor 602 and machine-readable storage medium 604, it may also include other components that would be suitable to one skilled in the art. For example, the computing device 600 may include the button 108 as in FIG. 1. The computing device 600 is an electronic device with the processor 602 capable of executing instructions 606-614, and as such embodiments of the computing device 600 include a computing device, mobile device, client device, personal computer, desktop computer, laptop, tablet, video game console, or other type of electronic device capable of executing instructions 606-614. The instructions 606-614 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processor 602 may fetch, decode, and execute instructions 606-614 to implement a zero watt state based on the engagement of a button, accordingly. Specifically, the processor 602 executes instructions 606-614 to: write a value corresponding to a hibernation or sleep state in a register; process the engagement of the button; and based on the engagement of the button, determine whether the computing device should implement the zero watt state; and transmit a signal to a switch for disconnecting the computing device to the power source.

The machine-readable storage medium 604 includes instructions 606-614 for the processor 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

In summary, examples disclosed herein reduce power consumption in a computing device through implementing a zero watt state. Additionally, the examples herein prevent data loss by coordinating the conditional power states prior to the zero watt state usage.

We claim:

1. A method comprising:
   preserving content on a computing device into a non-volatile memory by implementing a hibernation state prior to implementation of a zero watt state based on a determination that the computing device is in a standby state or normal operation state, wherein the computing device is to consume zero power in the zero watt state; and
   responsive to preserving the content, disconnecting the computing device from a power source to enter the zero watt state.

2. The method of claim 1, further comprising processing an engagement of a button on a computing device and preserving the content responsive to the engagement of the button.

3. The method of claim 2 wherein processing the engagement of the button comprises:
   generating a signal for transmission to an operating system to implement the hibernation state prior to implementation of the zero watt state.

4. The method of claim 3 further comprising:
   processing an engagement of a button on the computing device by:
      transmitting a signal to an operating system to write a hibernation state code to a register; and
      writing the hibernation state code to the register prior to implementation of the zero watt state.

5. The method of claim 3 further comprising:
   processing a disengagement of the button on the computing device; and
   connecting the computing device to the power source to implement the normal operation state of the computing device.

6. A computing device comprising:
   a processor; and
   a machine-readable storage medium storing instruction executable by the processor to:
      determine whether the computing device is in a standby state or normal operation state;
      based on the determination the computing device is in a standby state or normal operation state, preserve content on the computing device into a non-volatile memory by implementing a hibernation state; and
      responsive to preserving the content, disconnect a power source from the computing device to implement the zero watt state.

7. The computing device of claim 6 further comprising:
   a button to transmit a signal to an operating system; and
   an operating system to write a hibernation state code to a register prior to implementation of the zero watt state.

8. The computing device of claim 6 further comprising a register to indicate whether the zero watt state is enabled on the computing device.

9. The computing device of claim 6 further comprising a switch to connect the computing device to the power source.

10. The computing device of claim 6 further comprising a button, wherein the button comprises a spring loaded switch, and wherein the medium further comprises instructions to track a period of time in which the zero watt state is implemented and after this period of time has passed, transmit a signal to the spring loaded switch to release the button.

11. A non-transitory machine-readable storage medium comprising instructions that when executed by a processor cause a computing device to:
   process a state of inactivity to determine whether the computing device is in a hibernation state;
   based on the determination the computing device is not in the hibernation state, preserve content on the computing device into a non-volatile memory by implementing the hibernation state prior to implementation of a zero watt state; and
   transmit a signal to disconnect a power source from the computing device to implement the zero watt state.

* * * * *